(12) United States Patent
Rafferty et al.

(10) Patent No.: US 11,921,895 B2
(45) Date of Patent: Mar. 5, 2024

(54) COMPUTER-BASED SYSTEMS CONFIGURED FOR PROCURING REAL CONTENT ITEMS BASED ON USER AFFINITY GAUGED VIA SYNTHETIC CONTENT ITEMS AND METHODS OF USE THEREOF

(71) Applicant: Capital One Services, LLC, McLean, VA (US)

(72) Inventors: Galen Rafferty, Mahomet, IL (US); Anh Truong, Champaign, IL (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 341 days.

(21) Appl. No.: 17/496,125

(22) Filed: Oct. 7, 2021

(65) Prior Publication Data
US 2023/0113602 A1  Apr. 13, 2023

(51) Int. Cl.
*G06F 21/62* (2013.01)
*G06F 18/214* (2023.01)
*G06N 20/00* (2019.01)

(52) U.S. Cl.
CPC ........ *G06F 21/6254* (2013.01); *G06F 18/214* (2023.01); *G06F 21/6263* (2013.01); *G06N 20/00* (2019.01)

(58) Field of Classification Search
USPC .......................................................... 726/26
See application file for complete search history.

(56) References Cited

U.S. PATENT DOCUMENTS

| 7,552,862 | B2 | 6/2009 | Flake et al. | |
|---|---|---|---|---|
| 8,073,803 | B2* | 12/2011 | Murdock | G06Q 30/0276 706/62 |
| 9,639,847 | B2 | 5/2017 | Nyhan et al. | |
| 2011/0231246 | A1* | 9/2011 | Bhatia | G06Q 30/0244 705/14.43 |

(Continued)

OTHER PUBLICATIONS

Nino-Autulov-Fantulin "Synthetic Sequence Generator for Recommender Systems—Memory Biased Random Walk on a Sequence Multilayer Network" 2014, Springer International Publishing Switzerland, LNAI 8777, pp. 25-36, 2014 (Year: 2014).*

*Primary Examiner* — Sanchit K Sarker
(74) *Attorney, Agent, or Firm* — Greenberg Traurig, LLP

(57) ABSTRACT

Systems and methods of procuring real data items based on user affinity gauged via synthetic data items are disclosed. In one embodiment, an exemplary computer-implemented method may comprise: utilizing a trained machine learning model to generate a synthetic data item based on real user data; presenting the synthetic data item to those users; obtaining indications identifying user responses to the synthetic data item; obtaining user-defined control parameters from the users; configuring a user-defined control mechanism to share a portion of the real user data based thereon; obtaining a subset of the real user data based the user-defined control parameters; providing to a particular third-party data source at least one of: data regarding the synthetic data item, the at least one portion of the real user data, and the indications of the users; and then receiving a second real data item from the particular third-party data source.

20 Claims, 10 Drawing Sheets

(56) References Cited

U.S. PATENT DOCUMENTS

| | | | |
|---|---|---|---|
| 2012/0253923 A1 | 10/2012 | Durvasula et al. | |
| 2017/0116498 A1* | 4/2017 | Raveane | G06V 10/454 |
| 2017/0236182 A1* | 8/2017 | Ignatyev | G06Q 30/0631 |
| | | | 705/26.7 |
| 2022/0292543 A1* | 9/2022 | Henderson | G06Q 30/0252 |
| 2022/0405837 A1* | 12/2022 | Zaluski | G06N 3/047 |
| 2023/0093198 A1* | 3/2023 | Szelest | G06T 13/40 |
| 2023/0113602 A1* | 4/2023 | Rafferty | G06N 3/047 |
| | | | 726/26 |

* cited by examiner

COMPUTER-BASED SYSTEMS CONFIGURED FOR PROCURING REAL CONTENT ITEMS BASED ON USER AFFINITY GAUGED VIA SYNTHETIC CONTENT ITEMS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-implemented methods, improved computer-based platforms or systems, improved computing components and devices configured for one or more novel technological applications involving providing content and/or services based on user data regarded as private, yet without sharing such privacy sensitive user data to any third-party content provider.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or service management involved with payment transactions, content provisioning, privacy management, and/or associated content item procurement based on processing, implemented in a variety of ways.

SUMMARY OF DESCRIBED SUBJECT MATTER

In some embodiments, the present disclosure provides various exemplary technically improved computer-implemented methods involving generation of synthetic content items to gauge user's affinity so as to procure real content items based on the gauged user affinity, the method comprising steps such as: training, by one or more processors, a synthetic data generation machine learning model to obtain a trained synthetic data generation machine learning model that is trained to generate at least one synthetic data item, wherein the training is based at least in part on: i) training user data of a first plurality of users and ii) a plurality of training data items from a plurality of third-party data sources; receiving, by the one or more processors, at least one first real data item from at least one first computing device associated with at least one particular third-party data source; utilizing, by the one or more processors, the trained synthetic data generation machine learning model to generate at least one user-type specific synthetic data item for at least one user type based at least in part on real user data of a second plurality of users; presenting, by the one or more processors, the at least one user-type specific synthetic data item at a first visual presentation of an application executing at a plurality of second computing devices associated with the second plurality of users; obtaining, by the one or more processors, from the plurality of second computing devices, a plurality of indications identifying a plurality of user responses of the second plurality of users to the at least one user-type specific synthetic data item; obtaining, by one or more processors, one or more user-defined control parameters from the second plurality of users; configuring, by the one or more processors, a user-defined control mechanism to share at least one portion of the real user data of the second plurality of users based at least in part on the plurality of user-defined control parameters; obtaining, by the one or more processors, a subset of the real user data based at least in part on the plurality of user-defined control parameters; providing, by the one or more processors, to the at least one first computing device associated with the at least one particular third-party data source, at least: i) data regarding the at least one user-type specific synthetic data item, ii) the at least one portion of the real user data of the second plurality of users; and iii) the plurality of indications of the second plurality of users; receiving, by the one or more processors, in response to the providing, at least one second real data item from the at least one first computing device associated with the at least one particular third-party data source; and presenting, by the one or more processors, the at least one second real data item from the at least one particular third-party data source at a second GUI of the application executing at the plurality of second computing devices associated with the second plurality of users.

In some embodiments, the present disclosure also provides exemplary technically improved computer-based systems, and computer-readable media, including computer-readable media implemented with and/or involving one or more software applications, whether resident on personal transacting devices, computer devices or platforms, provided for download via a server and/or executed in connection with at least one network and/or connection, that include or involve features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
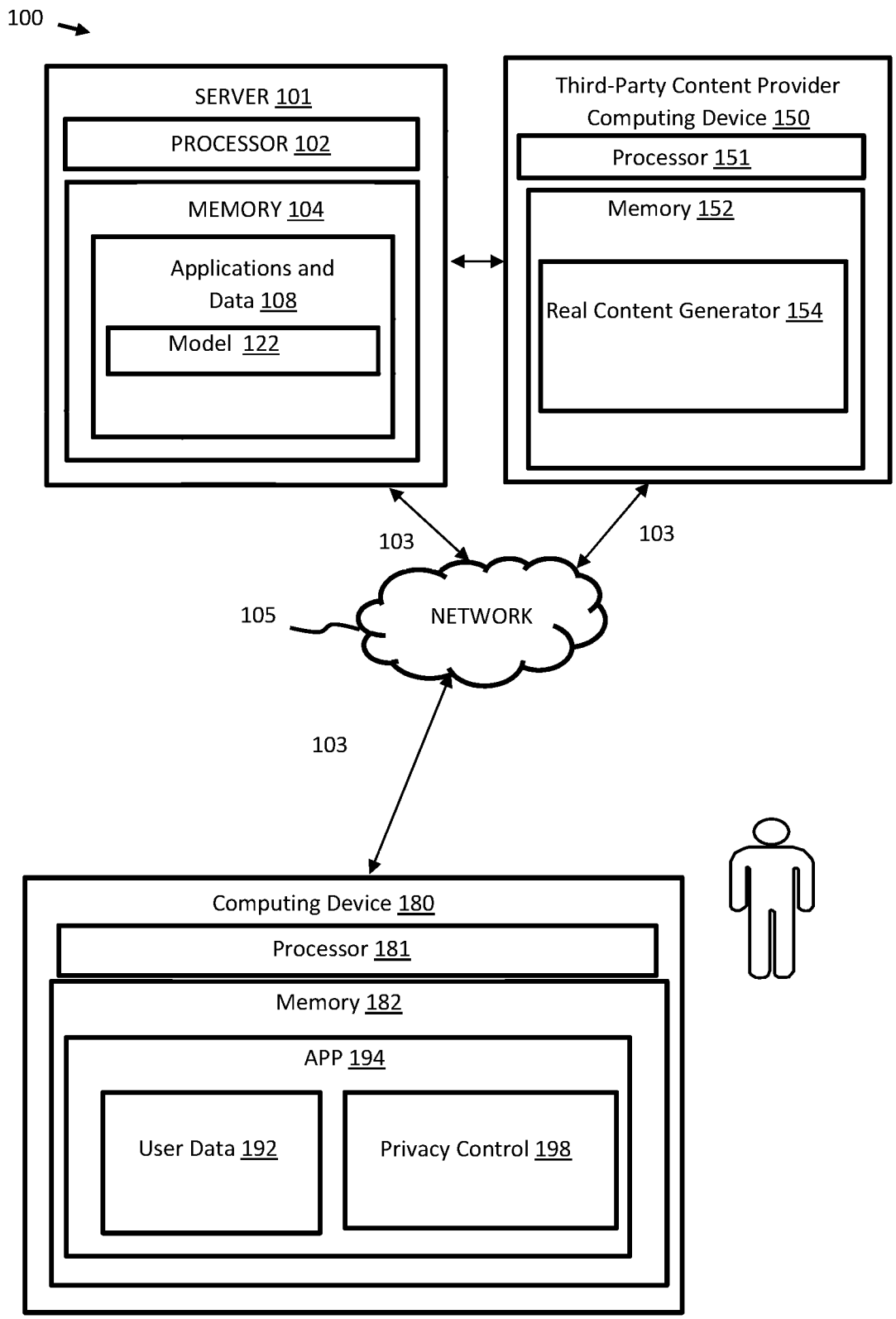
FIG. 1 is a block diagram of an exemplary system and/or platform illustrating aspects of procuring real content items based on user affinity gauged via synthetic content items, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

To benefit from the intelligence gleaned from user private data and at the same time not to impinge upon user privacy management and/or safeguard of user private data, various embodiments of the present disclosure provide for improved computer-based platforms or systems, improved computing components and devices configured for one or more novel technological applications involving obtaining user private data in a trusted and secure manner, generating content/services based on the private user data, as well as intelligence (e.g., machine learning models, etc.) empowered by the private user data, and/or monitoring and collecting more private user data regarding, for example, how users interact with such content/service presented thereto, all without sharing the private user data to third-party providers.

As explained in more detail, below, various exemplary computer-based systems and methods of the present disclosure allow for improved procurement of real content items based on user affinity gauged via synthetic content items. In one embodiment, an exemplary computer-implemented method of the present disclosure may include generating synthetic content items based on user data and a machine learning model, presenting the synthetic content items to a user to gauge the user's affinity towards the synthetic content items, as well as transmitting, and/or processing information related to the gauged user affinity and at least a portion of the user data to a third-party content provider to procure real content items for presentation to the user.

As used herein, in some embodiments, the term "synthetic content item" refers to a content item that is computer generated to represent an actual content item and may not be actionable by a user to whom the synthetic content item is presented. By way of non-limiting example, a synthetic content item may describe a promotional offer on a particular product or service (e.g., a specific discount percentage for consumer goods, etc.) without specifying a particular merchant or service provider who would fulfill the promotional offer. In some examples, a synthetic content item is a simulated offer for presentation to a user to probe, measure, or otherwise detect the level of affinity of the user in the simulated offer. As such, a synthetic content item may not be generated in a manner such that it includes actionable content such as an active link to allow the user to navigate to a merchant's website.

As used here, in some embodiments, the term "real content item" refers to a content item that has been generated by an entity (e.g., third-party company/advertiser, etc.) and/or is actionable by a user to whom the real content item is presented. By way of non-limiting example, a real content item may be substantially similar to the above-described synthetic content item in that the real content item may provide a promotional offer on products and/or services, but with specified merchants or service providers who are to fulfill the promotional offer. Accordingly, instead of or in addition to describing the details of an offer or promotional offer, the real content item informs the user of at least one merchant or service provider associated therewith, and includes data that allows the user to act upon the offer by interacting with the real content item. For instance, the user may click on a real content item to navigate to the offering merchant's e-commerce site to browse its collection of the products on which the offer is made, or save the real content item to a wallet application of a computing device of the user. In implementations, the real content item may include a bar code, a QR code, an alphanumeric string for the user to redeem at the merchant's web site and/or store.

As used herein, in some embodiments, the terms "user affinity" and "user interest" refer to a reaction, a response, or detected/detectable emotion(s) that a user expresses towards a displayed content item. The user affinity or interest may be represented by a binary value (e.g., yes or no), or a numerical or semantic description (e.g., 90% interested, somewhat interested). Such a reaction, a response, or a detected emotion may be indicated by the user or observed/monitored automatically.

Various embodiments disclosed herein may be implemented in connection with one or more entities that provide, maintain, manage, or otherwise offer any services relating to payment transaction systems. In some embodiments, the exemplary entity may be a financial service entity that provides, maintains, manages, or otherwise offers financial services. Such financial service entity may be a bank, credit card issuer, or any other type of financial service entity that generates, provides, manages, and/or maintains financial service accounts that entail providing a transaction card to one or more customers, the transaction card configured for use at a transacting terminal to access an associated financial service account. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary computer-based system 100 illustrating aspects of improved procuring real content items based on user affinity gauged via synthetic content items, in accordance with one or more embodiments of the present disclosure. System 100 may include at least one server 101, at least one computing device 150 associated with a third-party content provider (not shown), and at least one computing device 180 associated with a user, which may all communicate 103 over at least one communication network 105.

Server 101 may include one or more general purpose computers, servers, mainframe computers, desktop computers, etc. configured to execute instructions to perform server and/or client-based operations and operations consistent with aspects of the present disclosure. In some embodiments, server 101 may include a single server, a cluster of servers, or one or more servers located in local or remote locations. Server 101 may be standalone, or it may be part of a subsystem, which may, in turn, be part of a larger system. In some embodiments, server 101 may be associated with a financial institution, such as a credit card company that has issued a transaction card to the user.

Still referring to FIG. 1, server 101 may include at least one processor 102, and a memory 104, such as random-access memory (RAM). In some embodiments, memory 104 may store applications and data 108. Various embodiments herein may be configured such that the applications and data 108, when executed by the processor 102, may provide all or portions of the features and functionality associated with procuring real content items based on user affinity gauged via synthetic content items, in conjunction with or independent of the features and functionality implemented at the computing device 180 and/or the computing device 150. In some embodiments, the feature and functionalities may include operations such as: obtaining training user data from a first plurality of users, obtaining training real content items sent to the first plurality of user from one or more third-party content providers, training a synthetic content generation machine learning model with the training user data and the training real content data, generating synthetic content items by applying real user data of a second plurality of users, configured via a plurality of user defined control parameters, to the trained synthetic content generation machine learning model, transmitting the synthetic content item to the user, and procuring real content items from a particular third-party content provider based on the gauged affinity of the user towards the synthetic content items, upon sharing a portion of the real user data of the second plurality of users to the particular third-party content provider.

The application and data 108 may include a synthetic content generation machine learning model 122. In some embodiments, the synthetic content generation machine learning model 122 may be trained at the server 101. In other embodiments, the synthetic content generation machine learning model 122 may be trained by another entity with the training data provided by the another entity, and/or with the training data provided by server 101. In some embodiments, the synthetic content generation machine learning model 122 may also be trained and re-trained at the computing device 180 associated with the user. In the latter cases, the synthetic content generation machine learning model 122 may be trained and re-trained with the real user data of the user and real content items sent to the computing device 180 of the user from third-party content providers.

Various machine learning techniques may be applied to train and re-train the synthetic content generation machine learning model 122 with training data and feedback data, respectively. In various implementations, such a machine learning process may be supervised, unsupervised, or a combination thereof. In some embodiments, such a machine learning model may comprise a statistical model, a mathematical model, a Bayesian dependency model, a naive Bayesian classifier, a Support Vector Machine (SVMs), a neural network (NN), and/or a Hidden Markov Model.

In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of neural network may be executed as follows:
i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated.

In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated. In the embodiment shown in FIG. 1, an illustrative computing device 150 associated with a third-party content provider (e.g., a third-party data source) may comprise: one or more processors 151 and memory 152. Memory 152 may store instructions that, when executed by the one or more processors 151, perform various procedures, operations, or processes consistent with disclosed embodiments. In one embodiment, the memory 152 may include a real content generator program 154, when execute by the one or more processors 151, may perform operations such as receiving user data shared in connection with a request to procure real content items, generating real content items based on the received pertinent data, and transmitting the real content data to the user who has shared the user data in exchange for the real content items.

Still referring to FIG. 1, an illustrative computing device 180 associated with a user may comprise: one or more processors 181 and memory 182. Memory 182 may store instructions that, when executed by the one or more processors 181, perform various procedures, operations, or processes consistent with disclosed embodiments. In one embodiment, the memory 182 may include an application (APP) 194 that, when execute by the one or more processors 181, may perform operations such as storing real user data, configuring a plurality of user-defined control parameters to specify the user data for sharing in connection with procurement of real content items (one or both of the applying the real user data on the computing device 180 to the synthetic content generation machine learning model (e.g., NN-based model), and sharing a portion of the real user data to third-party content providers), displaying the synthetic content items and the real content items to the user, determining user affinity towards the synthetic content items, determining user reaction and feedback to the synthetic and real content items displayed to the user, training and re-training the synthetic content generation machine learning model, and generating synthetic content items based on the synthetic content generation machine learning model and the real user data shared with the app 194. In some embodiments, for portions of the synthetic content that include textual information and/or audio information, machine learning models such as a recurrent neural network (RNN), a generative adversarial network (GAN) (e.g., using a convolutional neural network (CNN), etc.), a transformer, and the like may be trained/retrained to generate respective textual or audio synthetic content. In some embodiments, for portions of the synthetic content that include imagery information, machine learning models such as a generative adversarial network (GAN) (e.g., using a convolutional neural network (CNN), etc.), a style transfer network (e.g., using GAN, CNN, etc.), and the like may be trained/retrained to generate imagery synthetic content. In some embodiments, for portions of the synthetic content that include video information, any exemplary models described above and/or any combinations of these exemplary models may be trained/retrained to generate video synthetic content.

In some embodiments, the app 194 may include a privacy control 198 and a user data collection 192. The user data collection 192 may include various user data generated, collected, or otherwise accessible by the computing device 180. The privacy control 198 may include one or more privacy control mechanisms that may apply the configured privacy control parameters to define a set of real user data for sharing with the app 194, and/or a third-party content provider. Details of the privacy control parameters and privacy control mechanism are illustrated with connection to FIGS. 4A-4B, below.

For the purpose of simplicity, features and functionality associated with the synthetic content generation machine learning model (e.g., training, re-training, applying to real user data) are illustrated as implemented by components of server 101. It should be noted that one more of those synthetic content generation machine learning model related aspects and features may be implemented at or in conjunction with the computing device 150 of the user. For example, the machine learning model may be partially trained at the server 101 with other users' user data and received real content items, and in turn transmitted to the computing device 180 to be fully trained with the user specific user data and received real content items. In another example, the converse may be performed such that the machine learning model may be initially trained at the computing device 180 and subsequently transmitted to the server 101 for application and/or further training with training data from other users. Further, the user data collection 192 may also be stored entirely on the computing device 150, in conjunction with the server 101, or entirely at server 101.

Various embodiments associated with FIG. 1 and related disclosure herein solve a technical problem of maintaining crucial, highly private user data secure and uncompromised, while also procuring real content items and associated value to users, which enables furnishing users with relevant real content items with no, highly reduced, and/or specifically user-controlled sharing of private user data. Aspects of the disclosed procurement of real content items based on user affinity gauged via synthetic content items mechanisms also yield more efficient and otherwise improved utilization of both processing and communication resources, such as via leveraging the exclusive, private access to comprehensive user data (both training user data and real user data) to train a machine learning model, using the trained machine learning model to generate synthetic content items, gauging a user's affinity in the synthetic content item, and based on the gauged affinity, selectively sharing a portion of the real user data with a third-party content provider to procure real content items, and avoiding the uncertain and potentially endless sharing, use and abuse of user data once been processed using the prior/known techniques. Moreover, various exemplary embodiments enabled by the disclosed procurement of real content items based on user affinity gauged via synthetic content items may allow for improved security, responsiveness, efficiency, accuracy, and expanded accessibility in terms of using/applying users' private data, and reducing the likelihood that the users may be overly conservative with sharing their private data or overshare their private data with third-parties, thereby increasing security and/or reducing or eliminating the need for unnecessary processing caused by irrelevant data and/or privacy-invading if not fraudulent actions otherwise avoided by the present content procurement mechanisms.

While only one server 101, computing device 150, network 105, and computing device 180 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

Figure 2A:
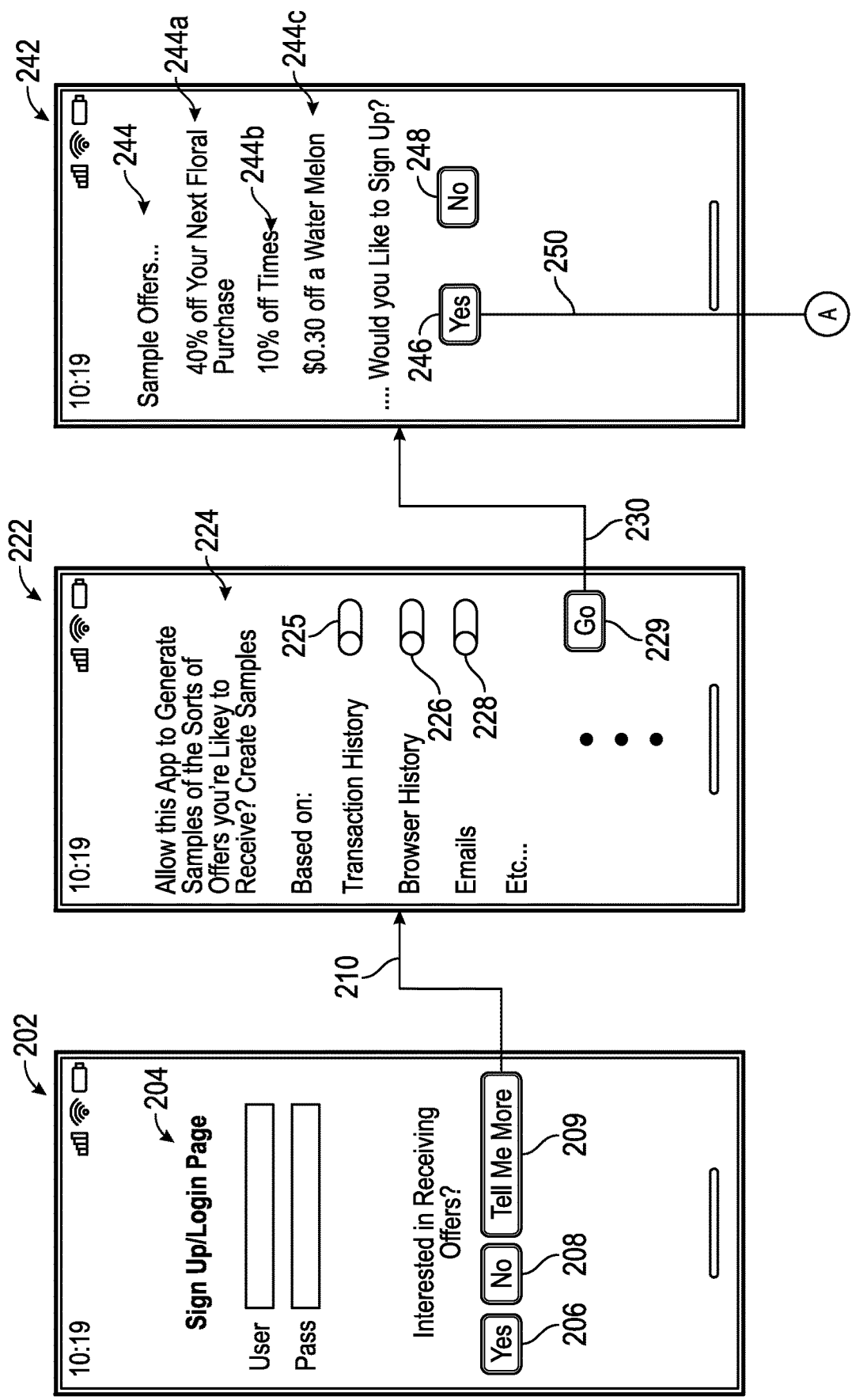
FIGS. 2A-2B are diagrams illustrating a series of exemplary graphical user interfaces (GUIs)) involving aspects and features associated with generating synthetic content items to gauge user affinity, consistent with exemplary aspects of certain embodiments of the present disclosure.
Figure 2B:
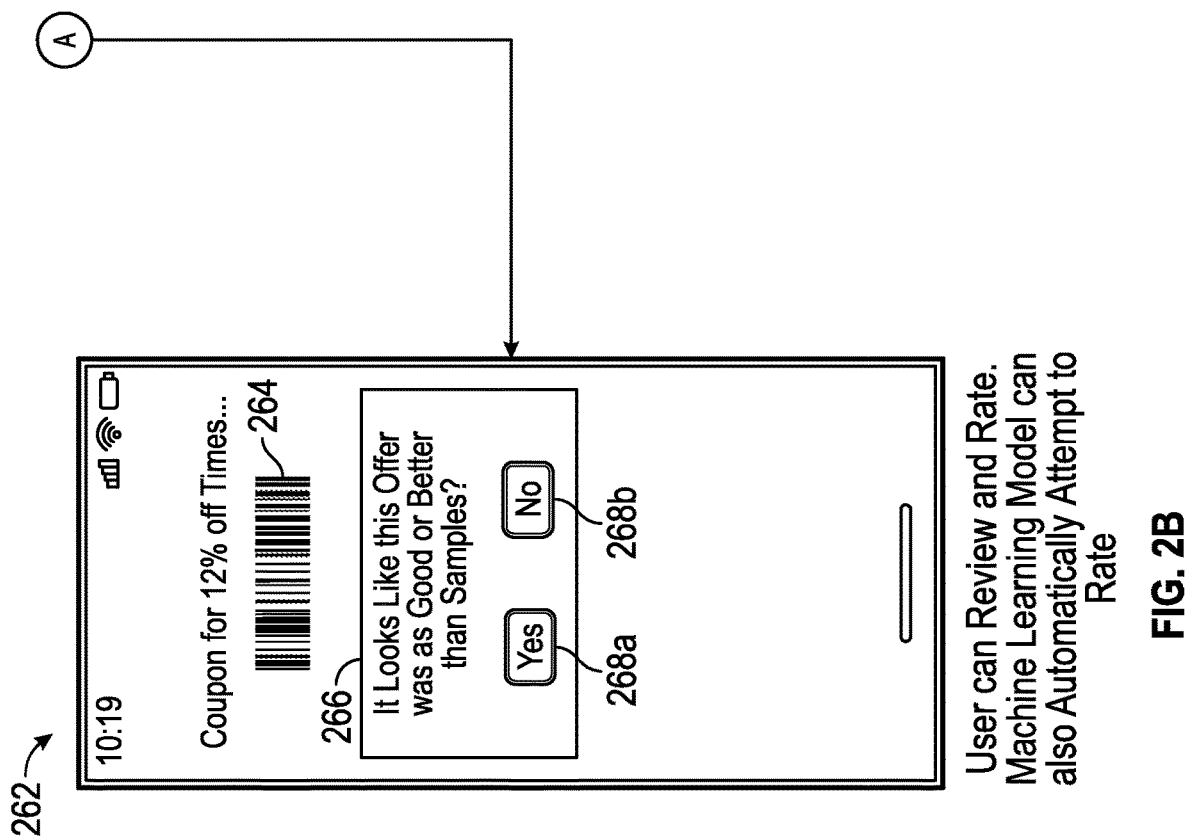

FIGS. 2A-2B are diagrams illustrating a series of exemplary graphical user interfaces (GUIs) involving aspects and features associated with generating synthetic content items to gauge user affinity, consistent with exemplary aspects of certain embodiments of the present disclosure. In some embodiments and as illustrated in FIG. 2A, a sign-up/login of a GUI 202 of an application is displayed at a screen of a mobile device associated with a user. Here, in addition to the login prompts for a username and password, the GUI 202 queries the user with a displayed text of "interested in receiving offers?" 204. The GUI 202 displays a "Yes" button 206, a "No" button 208, and "Tell Me More" button 209. Upon selecting the "Yes" button 206, in this example, the user indicates to the application the intent to receive real content items from third-party content providers by sharing his or her user data without restriction. Upon selecting the "No" button 208, the user indicates to the application that the user does not intend to receive any real content items and therefore declines to share any of his or her user data. Upon selecting the "Tell Me More" button 209, the user navigates 210 the GUI 202 to GUI 222.

At GUI 222, the user is presented, as explained by a message 224, with multiple toggle options to configure user data to share with the application. As shown here as a non-limiting example, the options include a toggle option 225 to share the user's transaction history with the application, a toggle option 226 to share the user's browser history with the application, a toggle option 228 to share the user's emails with the application. In some embodiments (not shown here), the GUI 222 may further be configured to provide the user with options to add or remove options with regard to what user data and/or how the user data is to be shared with the application.

Upon selecting a "Go" button 229, the user navigates 230 the GUI 222 to GUI 242. The GUI 242 is configured to display one or more synthetic content items generated by a synthetic content generation machine learning model based on the user data shared as specified using, for example, the GUI 222. In this example, the generated synthetic content items include an offer of "40% off your next floral purchase" 244a, an offer of "10% off tires" 244b, and an offer of "$0.30 off watermelon" 244c. The GUI 242 further prompts the user with a text of "Would you like to sign up?" 244. Upon selecting a "No" button 248, in this example, the application concludes and does not display any content items, real or synthetic, to the user. In other examples, the application may continue to display other synthetic content items at the GUI 242. In other examples, the application may continue back to the GUI 222 to allow the user to update the data sharing configuration so that different user data may be applied to the synthetic content generation machine learning model, as a result of which different synthetic content items may be presented to the user at GUI 242.

Upon selecting a "Yes" button 246, the user navigates 250 to GUI 262 of FIG. 2B. In some embodiments and as shown herein, the GUI 262 of the application is configured to present to the user real content items procured from one or more third-party content providers. As shown in this example, a coupon bar code 264 associated with an offer of "12% off tires" is displayed to the user. Here, the details with regard to how a third-party content provider is determined, what user data and information obtained based on the synthetic content item presented at GUI 242 are released to such third-party content providers will be illustrated with connection to FIGS. 4A-4B, below.

Here in this illustrated example, the GUI 262 is further configured to display a dialog 266 to collect feedback information from the user with regard to the procured coupon bar code 264. In this example, the dialog 266 surveys the user with the question of "It looks like this offer was as good or better than samples?" and allows the user to select a "Yes" button 268a or a "No" button 268b. Depending on which type of feedback the user provides, the application may utilize the feedback to re-train the synthetic content generation machine learning model, the details of which are illustrated with connection to FIGS. 4A-4B, below.

Figure 3:
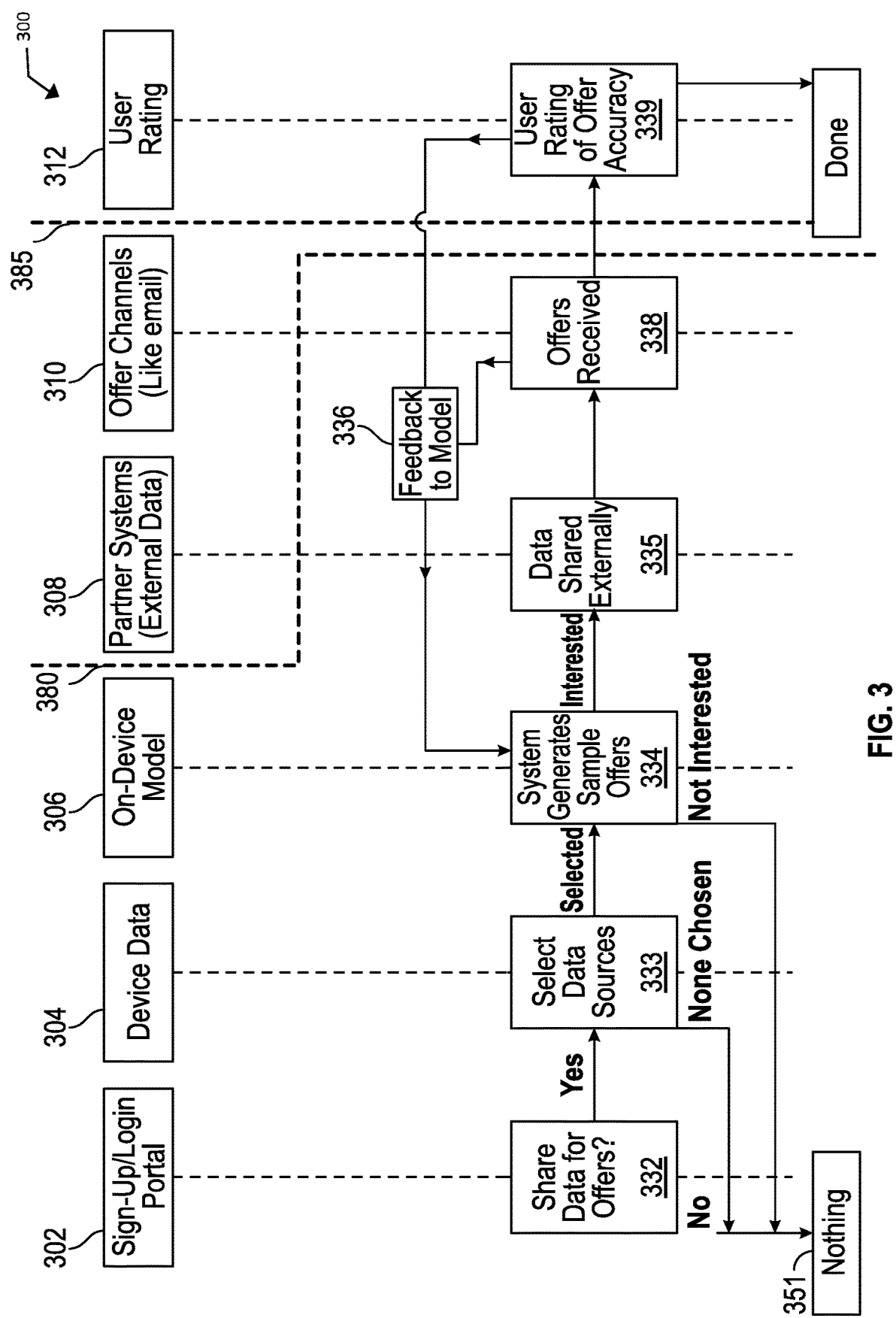
FIG. 3 is an interaction diagram depicting exemplary components, features and interactions related to procuring real content items based on user affinity gauged via synthetic content items, in accordance with certain embodiments of the present disclosure.

FIG. 3 is an interaction diagram illustrating an exemplary process 300 related to procuring real content items based on user affinity gauged via synthetic content items, consistent with exemplary aspects of at least some embodiments of the present disclosure. As shown in FIG. 3, partition lines 380 and 385 partition out a portion of the exemplary collection of entities/actions and the like, which may implement prior/know techniques for generating real content items by the partner systems (e.g., third-party data source such as third-party content providers) via various offer channels. Within this partition, the user is limited to a system where the user either selects to share all of his or her user data, or not to share any data at all with the partner systems. However, with the other entities/actions and the like as illustrated in this exemplary embodiment, the user is enabled to benefit from the features and functionality provided by the partition, without sharing all of the user data in a rigid, all-or-nothing manner, as available with known/prior techniques.

Here, as shown in FIG. 3, the improved process to procure real content items based on user affinity gauged via synthetic content items device may be initiated at a login/sign-up portal 302 of an application (e.g., the application 194). In this example, upon logging into the application at the portal 302, a user may be provided with an option with regard to whether or not to share his or her user data with the application, at 332. If the user opts not to share any of such user data with the application, the process proceeds to 351 and in turn provides no content items, synthetic or real, to the user. On the other hand, if the user opts to share his or her user data with the application, the user may be prompted to specify a data source to furnish the user data. In this illustrated example, the user may interact with, for example, the exemplary user interfaces illustrated in connection with FIG. 2A to specify one or more user-defined control parameters (e.g., privacy control parameters, etc.) to identify the required data sources. As shown herein, various data sources may be selected, at 333, from the collection of device data 304 available or otherwise accessible by a computing device associated with the user. Also, in this example, despite the choice that the users opts to share user data, if the user fails to configure data sources for the user data at 333, the process 300 treats the option to share user data as void, proceeding to 351 and providing no content item to the user.

In this example, an on-device synthetic content generation machine learning model 306 may be trained at the computing device of the user. In some embodiments, the synthetic content generation machine learning model 306 may be trained with the user data shared (internally) to the application according to 333, and real content items from a plurality of third-party content providers received at the computing device of the user. In other words, this example may also operate to entice the user to share all of the user data as the training data for the machine learning model as well as the trained machine learning model itself are local to the computing device of the user, thereby minimizing any potential privacy breaches. Here, applying the shared user data to the trained synthetic content generation machine learning model 306, synthetic content items (e.g., sample offers) are generated and presented to the user via the application at 334.

In the stage of 334 of this example, if it is determined that the user is not interested in the sample offers, the process 300 proceeds to 351 and stops providing the user with any content items, real or synthetic. On the other hand, if it is determined that the user is sufficiently interested in the sample offers, the process 300 proceeds to 335 to share at least a portion of the user data shared to the application, externally, to one or more third-party content providers 308 (e.g., partner systems). Details with regard to how to determine a portion of the user data to share externally with the third-party providers are illustrated with connection to FIGS. 4A-4B, below.

From this point on (e.g., and similar to the above-described collection of the entities and actions after the partition line 380), the one or more third-party content providers 308 may generate one or more real content items via various content channels (e.g., offer channels 310) for transmission to the user device. In this example, upon the user receiving the real content items (e.g., offers) at 338, the process 300 proceeds to (e.g., in addition to the above-described collection of the entities and actions before the partition line 385) prompting the user to provide a rating 312 on the offer accuracy, at 339. Here, the rating collected at 339 is further provided as feedback 336 to retrain the machine learning model 306 to generate synthetic content items. Various content channels may include communication channels such as an email client, an instant messaging client, an SMS client, a voice mail box, the application itself, and so on.

In this example, the process 300 concludes upon the user providing ratings 312 with regard to the real content items procured based on the interest in the synthetic content items. However, in other examples not shown here, the process 300 may proceed to stop presenting the real content item to the user, presenting another synthetic content item to the user, and so on.

Figure 4A:
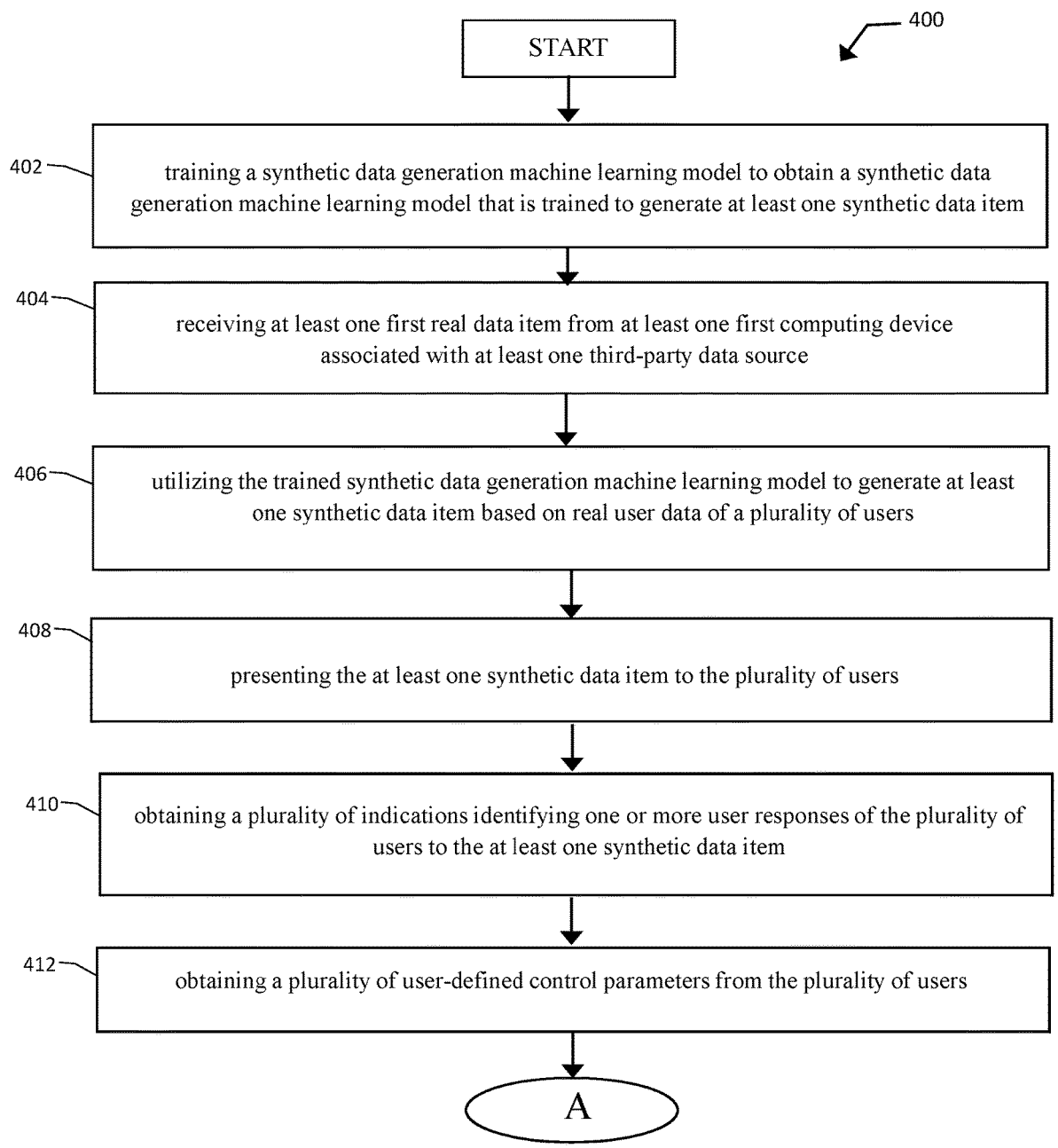
FIGS. 4A-4B are a flowchart illustrating an exemplary process related to procuring real content items based on user affinity gauged via synthetic content items, consistent with exemplary aspects of certain embodiments of the present disclosure.
Figure 4B:
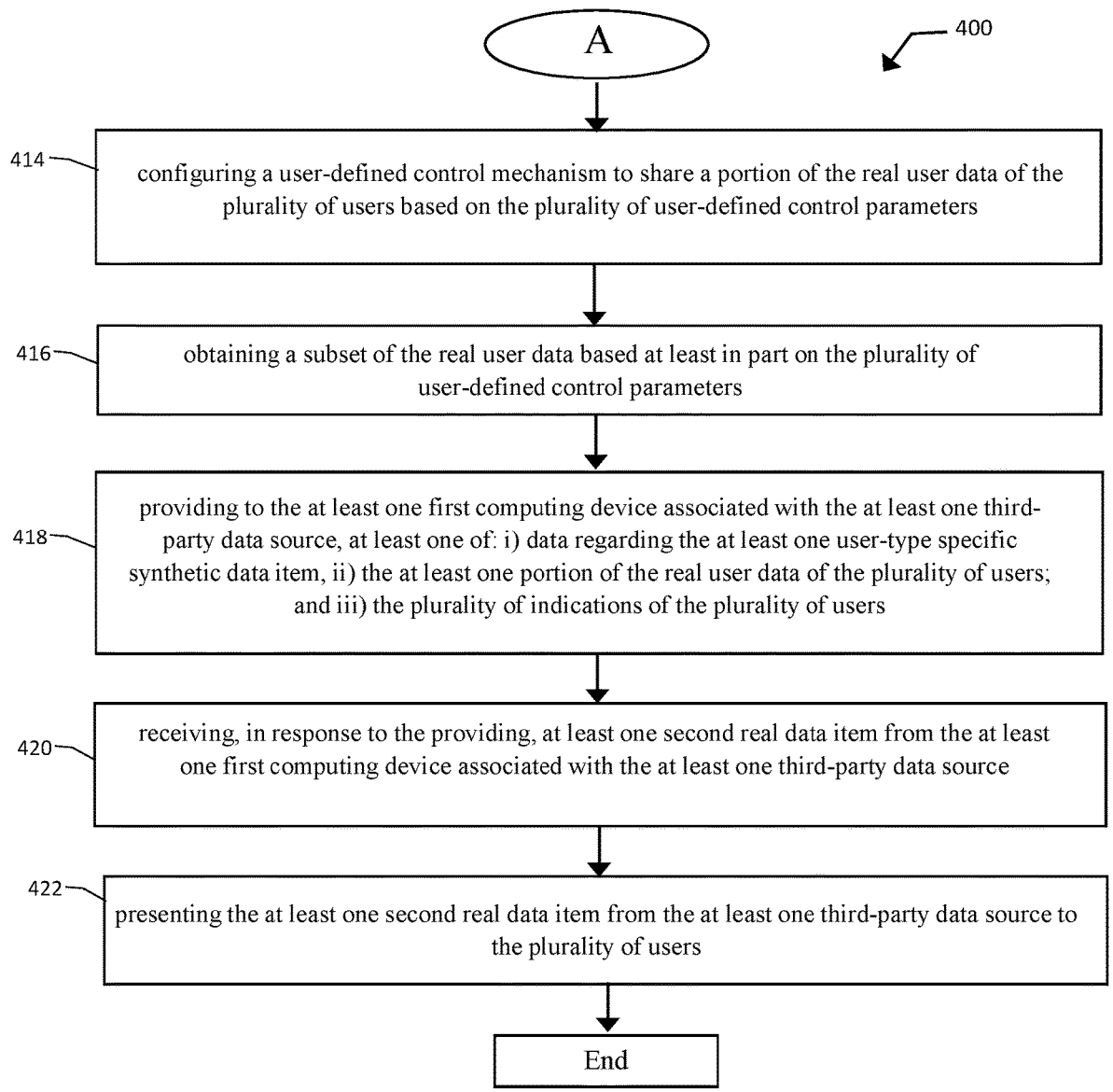

FIGS. 4A-4B are a flow diagram illustrating an exemplary process 400 related to procuring real data items (e.g., real content items, etc.) based on user affinity gauged via synthetic data items (e.g., synthetic content items, etc.), consistent with exemplary aspects of at least some embodiments of the present disclosure. Referring to FIGS. 4A-4B, the illustrative real data item procuring process 400 may comprise: training a synthetic content generation machine learning model to obtain a machine learning model that is trained to generate at least one synthetic data item, at 402; receiving at least one first real data item from at least one first computing device associated with at least one third-party data source, at 404; utilizing the trained synthetic data generation machine learning model to generate at least one synthetic data item based on real user data of a plurality of users, at 406; presenting the at least one synthetic data item to the plurality of users, at 408; obtaining, a plurality of indications identifying one or more user responses of the plurality of users to the at least one synthetic data item, at 410; obtaining a plurality of user-defined control parameters from the plurality of users, at 412; configuring a user-defined control mechanism to share a portion of the real user data of the plurality of users based on the plurality of user-defined control parameters, at 414; obtaining a subset of the real user data based on the plurality of user-defined control parameters, at 416; providing to the at least one first computing device associated with the at least one third-party data source, at least one of: i) data regarding the user-type specific synthetic data item, ii) the at least one portion of the real user data of the plurality of users; and iii) the plurality of indications of the plurality of users, at 418; receiving, in response to the providing, at least one second real data item from the at least one first computing device associated with the at least one third-party data source, at 420; and presenting the at least one second real data item from the at least one third-party data source to the plurality of users, at 422. In other embodiments, the real data item procuring process 400 may be carried out, in whole or in part, in conjunction with a server, a transacting device, and/or a mobile device that is connected via one or more networks to the server, which is executing instructions for performing one or more steps or aspects of various embodiments described herein.

In some embodiments, the real data item procuring process 400 may include, at 402, a step of training a synthetic data generation machine learning model to obtain a machine learning model that is trained to generate at least one synthetic data item. With regard to the disclosed innovation, the synthetic data generation machine learning model may be trained based at least in part on one or both of: i) training user data of a first plurality of users; and/or ii) a plurality of training data items from a plurality of third-party data sources. In implementations, training user data may comprise user data substantially similar to the user data of the embodiments illustrated in connection with FIG. 1 and details are not repeated herein.

In some embodiments, the synthetic data generation machine learning model may be trained via a server (e.g., the server 101 of FIG. 1), such as a processor of a computer platform, or an online computer platform. In some embodiments, the processor is associated with an entity that provides a financial service to the user. Here, for example, the at least one computer platform may comprise a financial service provider (FSP) system. This FSP system may comprise one or more servers and/or processors associated with a financial service entity that provides, maintains, manages, or otherwise offers financial services. Such financial service entity may include a bank, credit card issuer, or any other type of financial service entity that generates, provides, manages, and/or maintains financial service accounts for one or more customers. In other embodiments, the FSP system may outsource the training to a third-party model generator, or otherwise leverage the training user data, the training data items (e.g., the real user data of a plurality of users and the data items sent to the plurality of users), and/or trained models from a third-party data source, third-party machine learning model generators, and the like.

It should be further understood that, in some embodiments, the synthetic data generation machine learning model may be trained via a server in conjunction with a computing device of the user. Here, for example, the server may be configured to initially train a baseline synthetic data generation model based on the training user data of the first plurality of users (not including a user of a second plurality of users) and a plurality of training data items from the plurality of third-party data sources. Subsequently, the baseline synthetic data generation model may be transmitted to the computing device associated with the user of the second plurality of users to be trained with the particular user data of the user, as well as the particular training data items such as data items sent to the user from a plurality of third-party data sources. In implementations, the plurality of third-party data sources who have provided the data items to the user may be the same, overlapping, or different groups of the third-party sources who have supplied data items to the first plurality of users.

The real data item procuring process 400 may include, at 404, a step of receiving at least one first real data item from at least one first computing device associated with at least one third-party data source. In some embodiments, the at least one third-party data source may be the same third-party data source to which user data, synthetic data items, user indication are communicated at step 418, and/or the same third-party data source from which that the second real data items are received at step 422. In other embodiments, the at least one third-party data source may be an entity other than the third-party data source to which user data, synthetic data items, user indication are communicated at step 418, and/or the third-party data source from which that the second real data items are received at step 422.

The real data item procuring process 400 may include, at 406, a step of utilizing the trained synthetic data generation machine learning model to generate at least one synthetic data item. Embodiments herein may be configured such that the at least one synthetic data item is generated based at least in part on real user data of the plurality of users (e.g., a second plurality of users, etc.). In various embodiments, the first plurality of users (e.g., whose data is set as training data)

may be the same group as, a different group than, or a group having overlapping users with the second plurality of users (e.g., whose data is applied to the trained synthetic data generation machine learning model). The real data of the second plurality of user may be substantially similar to the real data of the embodiments illustrated in connection with FIGS. 1, 2A-2B, and 3. In some examples, the real user data of the second plurality of users may be stored on the plurality of second computing devices associated with the second plurality of users. In some embodiments, the at least one synthetic data item may comprise user-type specific synthetic data item. In other embodiments, the at least one synthetic data item may be generated for at least one user type in addition to being based at least in part on real user data of the second plurality of users. In various examples, user types may include any classification of users according to various suitable definitions. For instance, user types may be classified according to their respective purchasing habits such as, but not limited to, expending amount, merchandise types, service types, repeating purchasing types, returned purchasing types, and the like.

The real data item procuring process 400 may include, at 408, a step of presenting the at least one synthetic data item to the second plurality of users. In one example, the at least one user-type specific synthetic data item may be presented at a first graphical user interface (GUI) of an application executing at a plurality of second computing devices associated with the second plurality of users. In some embodiments, the application may be implemented by the application 194 of FIG. 1.

In some embodiments, prior to presenting the at least one specific synthetic data item, the real data item procuring process 400 may further include a step of determining a context with regard to when to present the at least one user-type specific synthetic data item at the first GUI. The context may comprise information relating to one or more of: a timing, a frequency, a duration of time, a not-to-disturb context, and an action of a user of the second plurality of users at the application. In one example, the context may be determined by the synthetic data generation machine learning model based on the real user data associated with the second plurality of user. That is, synthetic data generation machine learning model may be trained to learn and predict the manners which are likely to solicit less negative reactions from the user upon the presentation of synthetic data items. In another example, the context may be determined by the user himself or herself by pre-configuring parameters with regard to the contextual information.

In both examples, either a permissive and/or a prohibitive context may be provided. For example, such a context may be specified such that any synthetic data item is not to be displayed longer than a pre-configured period of time (e.g., 20 seconds, etc.), not to be displayed during a pre-configured timing (e.g., a time of a day, a day of a week, a holiday, etc.), not to be displayed when the user is engaging certain activities on the computing device (e.g., in the middle of arranging a transfer of fund to other users, etc.), not to be displayed when the user has provided no indication of interest for a pre-configured period of time (e.g., 24 hours, etc.), and/or upon a pre-configured number of synthetic data items (e.g., zero interest in ten synthetic data item displayed consecutively), not to be displayed once a pre-configured number of synthetic data items have been displayed during a pre-configured period of time (e.g., a maximal number of 20 synthetic items per day, etc.) regardless of the users' reaction, and so on.

The real data item procuring process 400 may include, at 410, a step of obtaining a plurality of indications identifying a plurality of user responses of the second plurality of users to the at least one synthetic data item. Various embodiments may be configured such that the plurality of indications are obtained from the plurality of second computing devices associated with the second plurality of users. The plurality of indications may be obtained via various suitable techniques, including, for example, an automatically detected indication, a user provided indication, and/or a combination thereof. For example, the user may interact with a selectable option (e.g., GUI component) associated with the synthetic data displayed at the first GUI to express an interest or a lack of interest. In another example, when it is detected that the user has gazed at the presented synthetic data item for longer than a pre-configured threshold period of time, or the synthetic data item has remained in active view of the first GUI for longer than the pre-configured threshold period of time, it is automatically detected that the user is sufficiently interested in the synthetic data item. In various embodiments, the pre-configured threshold period of time may as well be provided and/or updated by the synthetic data item generation machine learning model. In some examples, the machine learning model may further learn from the user's interactions (or the lack of interactions) with the presented synthetic data items and/or the real data items to fine tune such a threshold with respect to different types of products/service (e.g., a favorite brand, etc.), different types of promotions (e.g., a deep discount, etc.), different contexts associated with the user (e.g., the time of the day, a recent purchase of a product/service, etc.), and the like. By further non-limiting example, the user's reaction/emotion may be detected by a variety of suitable sensors such as, temperature sensors, heart rate sensors, blood flow sensor, pulse sensor, iris detector, breath detector, proximity sensor, and/or other biometric/environmental/human physiological condition sensors.

In some embodiments, based on the at least in part on a reaction of a user of the second plurality of users to the at least one user-type specific synthetic data item at the first GUI, the synthetic data generation machine learning model may be re-trained. Here, for example, if the user exhibits no interest in all of the synthetic data items, the synthetic data generation machine learning model may not have been trained properly. In some embodiments, the real user data of the user of the second plurality of users may be utilized to re-train the synthetic data generation machine learning model.

The real data item procuring process 400 may include, at 412, a step of obtaining a plurality of user-defined control parameters from the second plurality of users. According to various embodiments, the plurality of user-defined control parameters may comprise a plurality of privacy control parameters. In implementations, exemplary privacy control parameter may include information pertaining to at least one of: a transaction history, a web browsing history, an application history, emails, messages, social media data, phone communication, location data, personal financial data, transportation data, health data, sensor data, contact data, a time duration, inter-application/service data sharing conditions and/or permissions, and a granularity level. As described in the embodiments illustrated with reference to FIG. 2A, the plurality of privacy control parameters may be utilized to define a set of real user data that can be applied to the synthetic data generation model to generate one or more synthetic data items for the second plurality of users. In some examples, as the real user data of the second plurality of users are maintained at the computing devices associated with the second plurality of users, all of such real user data is applied to the synthetic data generation model.

The real data item procuring process 400 may include, at 414, a step of configuring privacy control mechanism to share a portion of the real user data of the second plurality of users based at least in part on the plurality of privacy control parameters; and at 416, a step of obtaining a subset of the real user data based at least in part on the plurality of privacy control parameters. Here, in one example, the privacy control mechanism may be configured to share all of the real user data as defined according to the plurality of privacy control parameters. In another example, the privacy control mechanism may be configured with one or more additional filters such that a portion of the real user data qualified under the plurality of privacy control parameters is further narrowed down to preserve user privacy. In implementations, any suitable filter may be applicable to include, for example, a time filter (e.g., only share the subset of real user data within a certain period of time, after a cutoff point of time, etc.), a location filter (e.g., only share the subset of real user data collected in a certain geo-areas, etc.), and so on. In various embodiments, the one or more filters may be configured and/or updated by the synthetic data item generation machine learning model and/or the user.

The real data item procuring process 400 may include, at 418, a step of providing, to the at least one first computing device associated with the at least one third-party data source, one or more of the following: i) data regarding the user-type specific synthetic data item; ii) the at least one portion of the real user data of the second plurality of users; and iii) the plurality of indications of the second plurality of users. In some embodiments, the at least one third-party data source may be determined based on the data of the synthetic data item presented to the second plurality of users. In other embodiments, the at least one third-party data source may be determined based on factors such as the users' rating of the data items previously procured from the third-party data sources, the degree of matching between the synthetic data items and the real data items procured based thereon, and the like. For instance, for the same type of product that is presented in the synthetic data item and offered by multiple third-party data sources, the data source offering the best promotion on the product may be selected, or the data source offering the brand favorite of the user may be selected, or the data source having be selected in the past for the user may be selected, and so on.

In implementations, the data regarding the user-type specific synthetic data item may comprise information such as the type of the product/service presented (e.g., tire, water melon, flowers, etc.), the detail of simulated offer (e.g., a monetary discount amount, a discount percentage, etc.), and the like. The plurality of indications of the second plurality of users may comprise information of a value associated with a state such as interested, or a degree of interest indicated or detected with regard to the synthetic data item.

In some embodiments, wherein the at least one portion of the real user data of the second plurality of users shared to the at least one third-party data source may be determined based on the at least one user-type specific synthetic data item. Here, various techniques may be applied to determine one or more real user data which, when fed to the synthetic data generation model, renders a prediction of the presented synthetic data item. In some examples, the real user data pertinent to the product/service described in the synthetic data item may be designated as the subset of data to share to the third-party data source.

In other embodiments, the data shared to the at least one third-party data source may be determined based on modifying the privacy control mechanism using the plurality of privacy control parameters. Details of modifying the privacy control mechanism using the plurality of privacy control parameters are substantially similar to those described above and are not repeated herein.

The real data item procuring process 400 may include, at 420, a step of receiving in response to the providing, at least one second real data item from the at least one first computing device associated with the at least one third-party data source; and at 422, a step of presenting the at least one second real data item from the at least one third-party data source at a second GUI of the application executing at the plurality of second computing devices associated with the second plurality of users.

In some embodiments, the real data item procuring process 400 may further include a step of providing an option at the second GUI to allow a user of the second plurality of users to input feedback pertaining to the presented at least one second real data item. For example, as shown in the non-limiting example illustrated in FIG. 2B, the real data item procuring process 400 may prompt the user of the second plurality of users to provide feedback for the presented at least one second real data item. In that example, the user is surveyed with a binary option to evaluate the at least one second real data item as better or as good as the offer provided in the synthetic data item. Various techniques and criteria may be applied at this stage to allow the user to input various feedback information with regard to the at least one second real data item. In some embodiments, the real data item procuring process 400 may request that the at least one third-party data source to notify, for example, the server 101 of FIG. 1, that the real data item procured based on the information provided by the server 101 has been acted upon (e.g., by redeeming the coupon code, scanning the bar code, QR code, sharing to another user, etc.) such that the real data item procuring process 400 may record the synthetic data item as sufficiently accurate in terms predicting the user's interest. In this example, information including the detailed offer presented in the real data item (e.g., the data source, the brand, the exact amount of monetary discount, the exact percentage of discount, the categories of products/service associated with the discount, the dates associated with the discount, etc.) may also be provided by the third-party data sources, or be collected by, for example, monitoring the real data item received in the application 194. In one example, the real data item procuring process 400 may further compare a degree of similarity between the at least one user-type specific synthetic data item and the at least one second real data item. In turn, the newly collected data and/or data derived from the collected data may be utilized to re-train the synthetic data generation machine learning model.

In some embodiments, the real data item procuring process 400 may further include a step of re-training the synthetic data generation machine learning model based at least in part on the feedback. Here, given an evaluation comparing the real data item with the synthetic data item, the real data item procuring process 400 may re-train the synthetic data generation machine learning model.

In some embodiments, the real data item procuring process 400 may, instead of procuring real data items from third-party data sources as described in the embodiments above, provide the second plurality of users with an offer better than an offer presented in the at least one user-type specific synthetic data item. In this example, based on the information collected upon presenting the synthetic data items to the second plurality of users, the real data item procuring process 400 may nevertheless generate real data items to be presented to the second plurality of users upon receiving the triggering notification or indication. In some non-limiting examples, the server 101 may be configured to collaborate with third-party partners to furnish real data items. In other words, the server 101 may subsequently service its real data item, and/or engage in a partnership with third-party data sources to offer a certain types of goods/ services in its own real data items. In yet another example, the server 101 may be configured to provide add-on real data items to entice the second plurality of users to, for example, transact the offers via a transaction card issued by the entity associated with the server 101 (e.g., a bank, a credit card company, etc.).

In some embodiments, the real data item procuring process 400 may further include a step of concluding presenting the at least one second real data item to a user of the second plurality of users at the second GUI. Here, for example, a user of the second plurality of users may not end up acting on (e.g., clicking to save the coupon code to the wallet application on the user's computing device, etc.) the presented real data item at the second GUI. In order not to waste the display real estate of, for example, the application 194, the real data item procuring process 400 may stop presenting the second real data item based on a factor such as: a timing determined by the synthetic data generation machine learning model, a timing pre-configured by the user, a context determined by the synthetic data generation machine learning model or pre-configured by the user, and the like.

Figure 5:
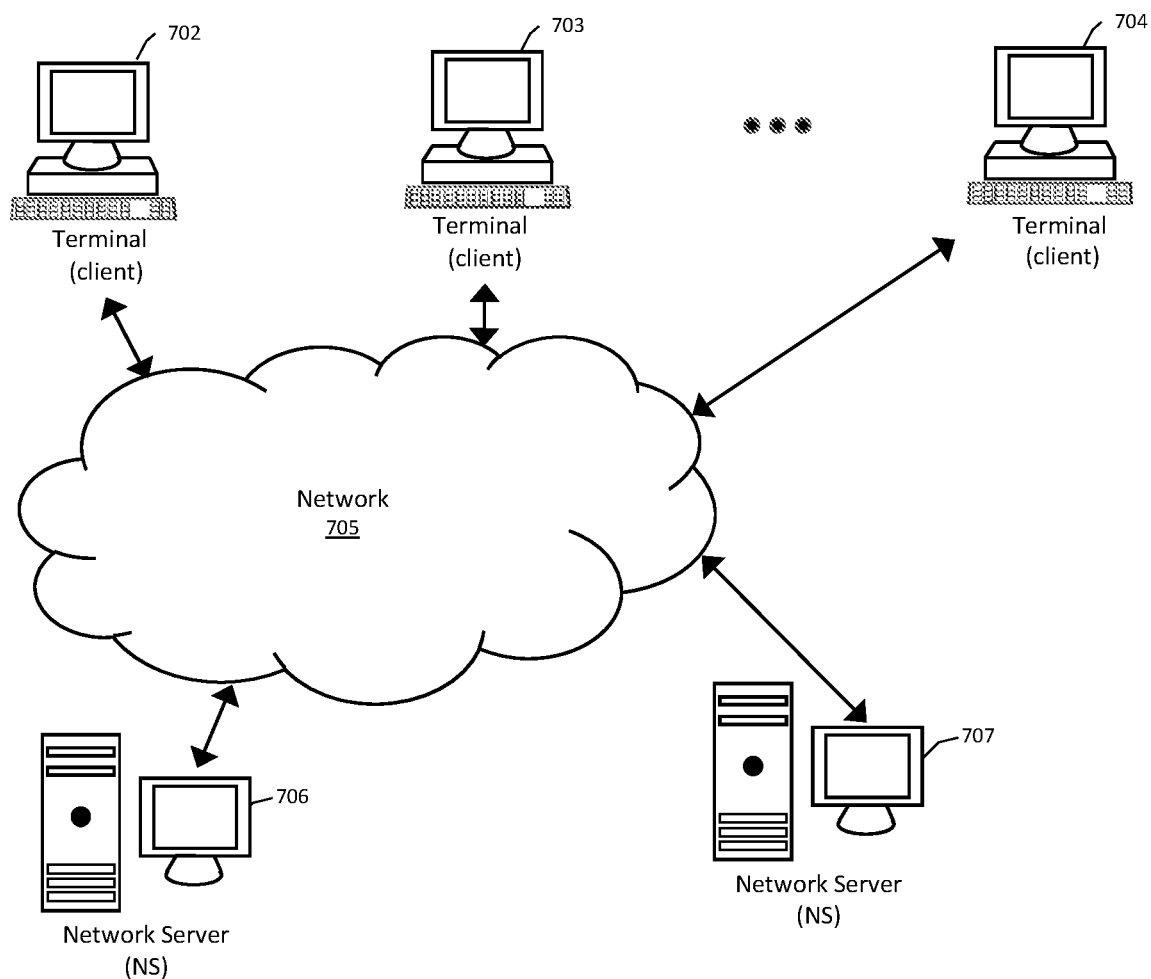
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/ platform may be configured to manage a large number of instances of software applications, users, and/or concurrent transactions, as detailed herein. In some embodiments, the exemplary computer-based system/platform may be based on a scalable computer and/or network architecture that incorporates various strategies for assessing the data, caching, searching, and/or database connection pooling. An example of the scalable architecture is an architecture that is capable of operating multiple servers.

In some embodiments, referring to FIG. 5, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/ or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content sources, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
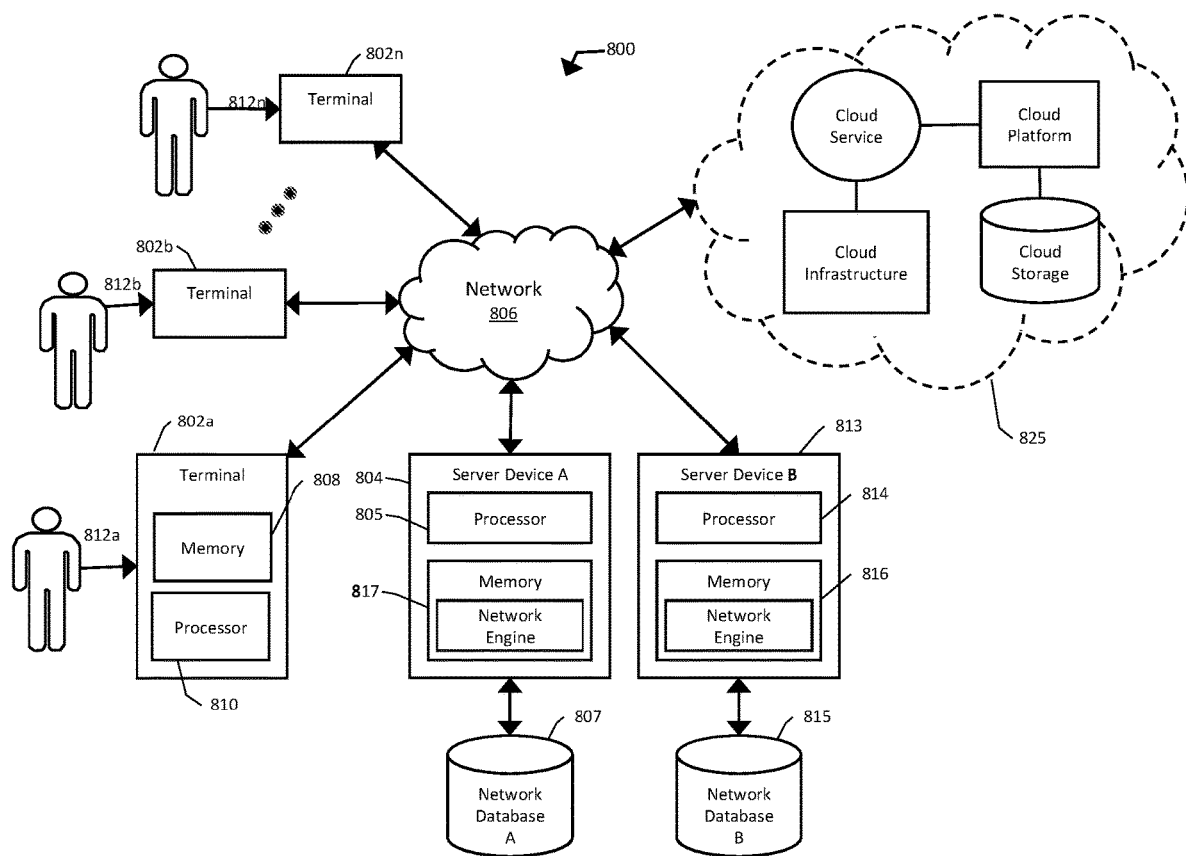
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b through 802n shown each at least includes non-transitory computer-readable media, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable non-transitory media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™ Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 812n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
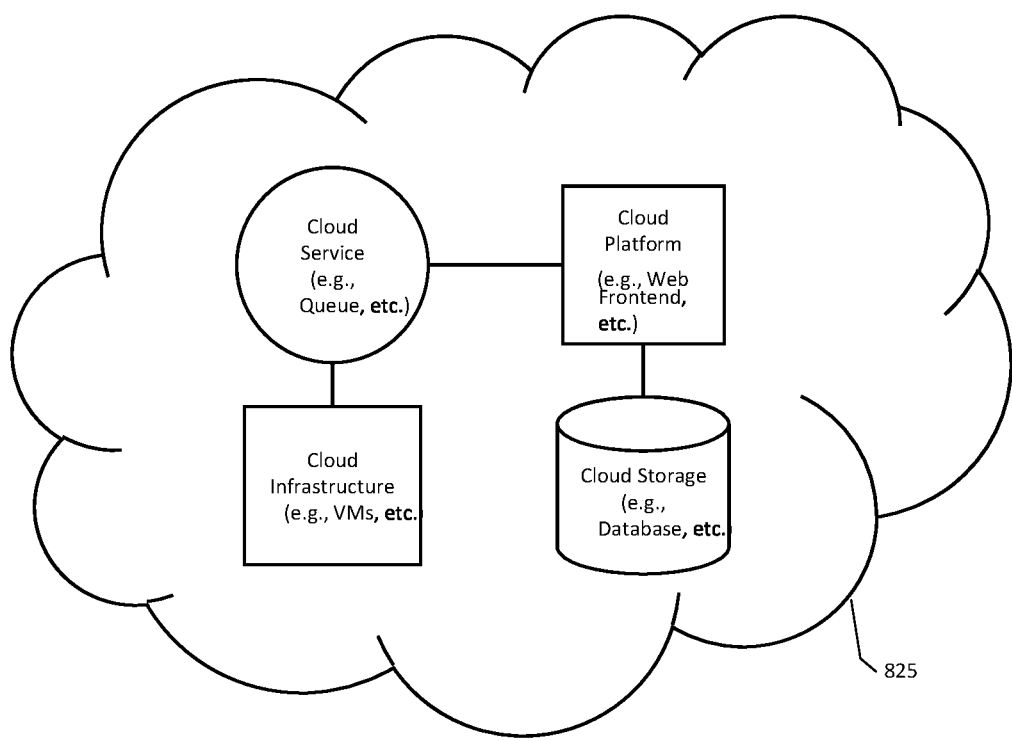
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
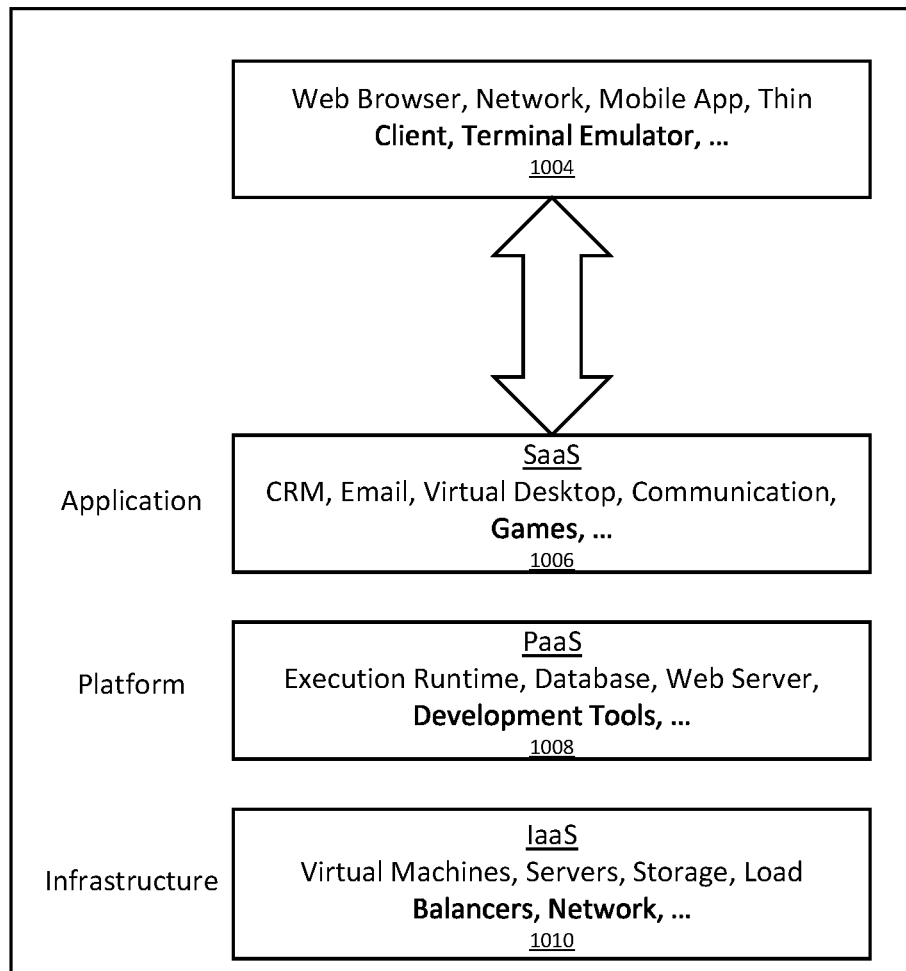

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enabled devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider/source. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

What is claimed is:

Clause 1. A method comprising:
  training, by one or more processors, a synthetic data generation machine learning model to obtain a trained synthetic data generation machine learning model that is trained to generate at least one synthetic data item, wherein the training is based at least in part on:
    i) training user data of a first plurality of users; and
    ii) a plurality of training data items from a plurality of third-party data sources;
  receiving, by the one or more processors, at least one first real data item from at least one first computing device associated with at least one particular third-party data source;
  utilizing, by the one or more processors, the trained synthetic data generation machine learning model to generate at least one user-type specific synthetic data item for at least one user type based at least in part on real user data of a second plurality of users;
  presenting, by the one or more processors, the at least one user-type specific synthetic data item at a first graphic user interface (GUI) of an application executing at a plurality of second computing devices associated with the second plurality of users;
  obtaining, by the one or more processors, from the plurality of second computing devices, a plurality of indications identifying a plurality of user responses of the second plurality of users to the at least one user-type specific synthetic data item;
  obtaining, by one or more processors, a plurality of privacy control parameters from the second plurality of users;

configuring, by the one or more processors, a user-defined control mechanism to share a portion of the real user data of the second plurality of users based at least in part on the plurality of user-defined control parameters;

obtaining, by the one or more processors, a subset of the real user data based at least in part on the plurality of user-defined control parameters;

providing, by the one or more processors, to the at least one first computing device associated with the at least one particular third-party data source, at least:
i) data regarding the user-type specific synthetic data item,
ii) the at least one portion of the real user data of the second plurality of users; and
iii) the plurality of indications of the second plurality of users;

receiving, by the one or more processors, in response to the providing, at least one second real data item from the at least one first computing device associated with the at least one particular third-party data source; and presenting, by the one or more processors, the at least one second real data item from the at least one particular third-party data source at a second GUI of the application executing at the plurality of second computing devices associated with the second plurality of users.

Clause 2. The method of clause 1 or of any clause herein, further comprising:
providing, by the one or more processors, an option at the second GUI to allow a user of the second plurality of users to input feedback pertaining to the presented at least one second real data item.

Clause 3. The method of clause 2 or of any clause herein, further comprising:
re-training, by the one or more processors, the synthetic data generation machine learning model based at least in part on the feedback.

Clause 4. The method of clause 1 or of any clause herein, further comprising:
re-training, by the one or more processors, the synthetic data generation machine learning model based at least in part on a reaction of a user of the second plurality of users to the at least one user-type specific synthetic data item at the first GUI.

Clause 5. The method of clause 1 or of any clause herein, further comprising concluding presenting the at least one second real data item to a user of the second plurality of users at the second GUI based on a timing determined by the synthetic data generation machine learning model.

Clause 6. The method of clause 1 or of any clause herein, further comprising, prior to presenting the at least one user-type specific synthetic data item:
determining, by the one or more processors, a context with regard to when to present the at least one user-type specific synthetic data item at the first GUI via the synthetic data generation machine learning model, the context comprising at least one of: a timing, a frequency, a duration of time, a not-to-disturb threshold, and an action of a user of the second plurality of users at the application.

Clause 7. The method of clause 1 or of any clause herein, wherein the plurality of user-defined control parameters comprise at least one of: transaction history, web browsing history, application history, emails, messages, social media data, phone communication, location data, personal financial data, transportation data, health data, sensor data, contact data, a time duration, and a granularity level.

Clause 8. The method of clause 1 or of any clause herein, wherein the real user data of the second plurality of users is stored on the plurality of second computing devices associated with the second plurality of users.

Clause 9. The method of clause 1 or of any clause herein, wherein the at least one portion of the real user data of the second plurality of users shared to the at least one particular third-party data source is determined based on the at least one user-type specific synthetic data item.

Clause 10. The method of clause 1 or of any clause herein, wherein the data shared to the at least one particular third-party data source is determined based on modifying the user-defined control mechanism using the plurality of user-defined control parameters.

Clause 11. The method of clause 1 or of any clause herein, wherein the at least one second real data item is generated by the one or more processors to provide the second plurality of users with an offer better than an offer presented in the at least one user-type specific synthetic data item.

Clause 12. The method of clause 1 or of any clause herein, wherein the one or more processors are configured to automatically detect the plurality of user responses to the at least one user-type specific synthetic data item.

Clause 13. The method of clause 1 or of any clause herein, further comprising comparing, by the one or more processors, a degree of similarity between the at least one user-type specific synthetic data item and the at least one second real data item.

Clause 14. A system comprising:
one or more processors; and
a memory in communication with the one or more processors and storing instructions that, when executed by the one or more processors, cause the one or more processors to:
utilize a trained synthetic data generation machine learning model to generate at least one user-type specific synthetic data item for at least one user type based at least in part on real user data of a second plurality of users, wherein the synthetic data generation machine learning model is trained based at least in part on:
i) training user data of a first plurality of users; and
ii) a plurality of training data items from a plurality of third-party data sources, the plurality of training data items comprising at least one first real data item from at least one particular third-party data source;
present the at least one user-type specific synthetic data item at a first graphic user interface (GUI) of an application executing at a plurality of second computing devices associated with the second plurality of users;
obtain, from the plurality of second computing devices, a plurality of indications identifying a plurality of user responses of the second plurality of users to the at least one user-type specific synthetic data item;
obtain a plurality of user-defined control parameters from the second plurality of users;
configure a user-defined control mechanism to share a portion of the real user data of the second plurality of users based at least in part on the plurality of user-defined control parameters;
obtain a subset of the real user data based at least in part on the plurality of user-defined control parameters;
provide to the at least one first computing device associated with the at least one particular third-party data source, at least:
i) data regarding the at least one user-type specific synthetic data item,
ii) the at least one portion of the real user data of the second plurality of users; and iii) the plurality of indications of the second plurality of users;

receive, in response to the providing, at least one second real data item from the at least one first computing device associated with the at least one particular third-party data source; and present the at least one second real data item from the at least one particular third-party data source at a second GUI of the application executing at the plurality of second computing devices associated with the second plurality of users.

Clause 15. The system of clause 14 or of any clause herein, wherein the instructions further cause the one or more processors to update the synthetic data generation machine learning model based at least in part on at least one feedback pertaining to the presented at least one second real data item from the second plurality of users.

Clause 16. The system of clause 14 or of any clause herein, wherein the instructions further cause the one or more processors to, prior to presenting the at least one user-type specific synthetic data item, determine a context with regard to when to present the at least one user-type specific synthetic data item at the first GUI via the synthetic data generation machine learning model, the context comprising at least one of: a timing, a frequency, a duration of time, a not-to-disturb threshold, and an action of a user of the second plurality of users at the application.

Clause 17. The system of clause 14 or of any clause herein, wherein the plurality of user-defined control parameters comprise at least one of: transaction history, web browsing history, application history, emails, messages, social media data, phone communication, location data, personal financial data, transportation data, health data, sensor data, contact data, a time duration, and a granularity level.

Clause 18. A non-transitory computer readable storage medium for tangibly storing computer program instructions capable of being executed by a computer processor, the computer program instructions defining the steps of:

training a synthetic data generation machine learning model to obtain a trained synthetic data generation machine learning model that is trained to generate at least one synthetic data item, wherein the training is based at least in part on:
i) training user data of a first plurality of users; and
ii) a plurality of training data items from a plurality of third-party data sources;

receiving at least one first real data item from at least one first computing device associated with at least one particular third-party data source;

utilizing the trained synthetic data generation machine learning model to generate at least one user-type specific synthetic data item for at least one user type based at least in part on real user data of a second plurality of users;

presenting the at least one user-type specific synthetic data item at a first graphic user interface (GUI) of an application executing at a plurality of second computing devices associated with the second plurality of users;

obtaining from the plurality of second computing devices, a plurality of indications identifying a plurality of user responses of the second plurality of users to the at least one user-type specific synthetic content item;

obtaining a plurality of user-defined control parameters from the second plurality of users;

configuring a user-defined control mechanism to share a portion of the real user data of the second plurality of users based at least in part on the plurality of user-defined control parameters;

obtaining a subset of the real user data based at least in part on the plurality of user-defined control parameters;

providing to the at least one first computing device associated with the at least one particular third-party content source, at least one of:
i) data regarding the at least one user-type specific synthetic content item,
ii) the at least one portion of the real user data of the second plurality of users; and
iii) the plurality of indications of the second plurality of users;

receiving, in response to the providing, at least one second real content item from the at least one first computing device associated with the at least one particular third-party content source; and presenting the at least one second real content item from the at least one particular third-party content source at a second GUI of the application executing at the plurality of second computing devices associated with the second plurality of users.

Clause 19. The computer readable storage medium of clause 18 or of any clause herein, the steps further comprising updating the synthetic content generation machine learning model based at least in part on at least one feedback pertaining to the presented at least one second real content item from the second plurality of users.

Clause 20. The computer readable storage medium of clause 18 or of any clause herein, the steps further comprising, prior to presenting the at least one user-type specific synthetic content item, determining a context with regard to when to present the at least one user-type specific synthetic content item at the first GUI via the synthetic content generation machine learning model, the context comprising at least one of: a timing, a frequency, a duration of time, a not-to-disturb threshold, and an action of a user of the second plurality of users at the application.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

training, by one or more processors, a synthetic data generation machine learning model to obtain a trained synthetic data generation machine learning model that is trained to generate at least one synthetic data item, wherein the training is based at least in part on:
i) training user data of a first plurality of users; and
ii) a plurality of training data items from a plurality of third-party data sources;

receiving, by the one or more processors, at least one first real data item from at least one first computing device associated with at least one particular third-party data source;

utilizing, by the one or more processors, the trained synthetic data generation machine learning model to generate at least one user-type specific synthetic data item for at least one user type based at least in part on real user data of a second plurality of users;

presenting, by the one or more processors, the at least one user-type specific synthetic data item at a first visual presentation of an application executing at a plurality of second computing devices associated with the second plurality of users;

obtaining, by the one or more processors, from the plurality of second computing devices, a plurality of indications identifying a plurality of user responses of the second plurality of users to the at least one user-type specific synthetic data item;

obtaining, by one or more processors, one or more user-defined control parameters from the second plurality of users;

configuring, by the one or more processors, a user-defined control mechanism to share at least one portion of the real user data of the second plurality of users based at least in part on the plurality of user-defined control parameters;

obtaining, by the one or more processors, a subset of the real user data based at least in part on the plurality of user-defined control parameters;

providing, by the one or more processors, to the at least one first computing device associated with the at least one particular third-party data source, at least:

i) data regarding the at least one user-type specific synthetic data item, ii) the at least one portion of the real user data of the second plurality of users; and iii) the plurality of indications of the second plurality of users;

receiving, by the one or more processors, in response to the providing, at least one second real data item from the at least one first computing device associated with the at least one particular third-party data source; and presenting, by the one or more processors, the at least one second real data item from the at least one particular third-party data source at a second GUI of the application executing at the plurality of second computing devices associated with the second plurality of users.

2. The method of claim 1, further comprising:

providing, by the one or more processors, an option at the second GUI to allow a user of the second plurality of users to input feedback pertaining to the presented at least one second real data item.

3. The method of claim 2, further comprising:

re-training, by the one or more processors, the synthetic data generation machine learning model based at least in part on the feedback.

4. The method of claim 1, further comprising:

re-training, by the one or more processors, the synthetic data generation machine learning model based at least in part on a reaction of a user of the second plurality of users to the at least one user-type specific synthetic data item at the first GUI.

5. The method of claim 1, further comprising, concluding, and presenting the at least one second real data item to a user of the second plurality of users at the second GUI based on a timing determined by the synthetic data generation machine learning model.

6. The method of claim 1, further comprising, prior to presenting the at least one user-type specific synthetic data item:

determining, by the one or more processors, a context with regard to when to present the at least one user-type specific synthetic data item at the first GUI via the synthetic data generation machine learning model, the context comprising at least one of: a timing, a frequency, a duration of time, a not-to-disturb threshold, and an action of a user of the second plurality of users at the application.

7. The method of claim 1, wherein the plurality of user-defined control parameters comprise at least one of: transaction history, web browsing history, application history, emails, messages, social media data, phone communication, location data, personal financial data, transportation data, health data, sensor data, contact data, a time duration, and a granularity level.

8. The method of claim 1, wherein the real user data of the second plurality of users is stored on the plurality of second computing devices associated with the second plurality of users.

9. The method of claim 1, wherein the at least one portion of the real user data of the second plurality of users shared to the at least one particular third-party data source is determined based on the at least one user-type specific synthetic data item.

10. The method of claim 1, wherein the data shared to the at least one particular third-party data source is determined based on modifying the user-defined control mechanism using the plurality of user-defined control parameters.

11. The method of claim 1, wherein the at least one second real data item is generated by the one or more processors to provide the second plurality of users with an offer better than an offer presented in the at least one user-type specific synthetic data item.

12. The method of claim 1, wherein the one or more processors are configured to automatically detect the plurality of user responses to the at least one user-type specific synthetic data item.

13. The method of claim 1, further comprising comparing, by the one or more processors, a degree of similarity between the at least one user-type specific synthetic data item and the at least one second real data item.

14. The method of claim 1, wherein the plurality of user defined control parameters is a plurality of privacy control parameters.

15. A system comprising:

one or more processors; and a memory in communication with the one or more processors and storing instructions that, when executed by the one or more processors, cause the one or more processors to:

utilize a trained synthetic data generation machine learning model to generate at least one user-type specific synthetic data item for at least one user type based at least in part on real user data of a second plurality of users, wherein the synthetic data generation machine learning model is trained based at least in part on:

i) training user data of a first plurality of users; and ii) a plurality of training data items from a plurality of third-party data sources, the plurality of training data items comprising at least one first real data item from at least one particular third-party data source;

present the at least one user-type specific synthetic data item at a first graphic user interface (GUI) of an application executing at a plurality of second computing devices associated with the second plurality of users;

obtain, from the plurality of second computing devices, a plurality of indications identifying a plurality of user responses of the second plurality of users to the at least one user-type specific synthetic data item;
obtain a plurality of user-defined control parameters from the second plurality of users;
configure a user-defined control mechanism to share a portion of the real user data of the second plurality of users based at least in part on the plurality of user-defined control parameters;
obtain a subset of the real user data based at least in part on the plurality of user-defined control parameters;
provide to the at least one first computing device associated with the at least one particular third-party data source, at least:
  i) data regarding the at least one user-type specific synthetic data item,
  ii) the at least one portion of the real user data of the second plurality of users; and
  iii) the plurality of indications of the second plurality of users;
receive, in response to the providing, at least one second real data item from the at least one first computing device associated with the at least one particular third-party data source; and
present the at least one second real data item from the at least one particular third-party data source at a second GUI of the application executing at the plurality of second computing devices associated with the second plurality of users.

16. The system of claim 15, wherein the instructions further cause the one or more processors to update the synthetic data generation machine learning model based at least in part on at least one feedback pertaining to the presented at least one second real data item from the second plurality of users.

17. The system of claim 15, wherein the instructions further cause the one or more processors to, prior to presenting the at least one user-type specific synthetic data item, determine a context with regard to when to present the at least one user-type specific synthetic data item at the first GUI via the synthetic data generation machine learning model, the context comprising at least one of: a timing, a frequency, a duration of time, a not-to-disturb threshold, and an action of a user of the second plurality of users at the application.

18. The system of claim 15, wherein the plurality of user-defined control parameters comprise at least one of: transaction history, web browsing history, application history, emails, messages, social media data, phone communication, location data, personal financial data, transportation data, health data, sensor data, contact data, a time duration, and a granularity level.

19. A non-transitory computer readable storage medium for tangibly storing computer program instructions capable of being executed by a computer processor, the computer program instructions defining the steps of:
training a synthetic data generation machine learning model to obtain a trained synthetic data generation machine learning model that is trained to generate at least one synthetic data item, wherein the training is based at least in part on:
  i) training user data of a first plurality of users; and
  ii) a plurality of training data items from a plurality of third-party data sources;
receiving at least one first real data item from at least one first computing device associated with at least one particular third-party data source;
utilizing the trained synthetic data generation machine learning model to generate at least one user-type specific synthetic data item for at least one user type based at least in part on real user data of a second plurality of users;
presenting the at least one user-type specific synthetic data item at a first graphic user interface (GUI) of an application executing at a plurality of second computing devices associated with the second plurality of users;
obtaining from the plurality of second computing devices, a plurality of indications identifying a plurality of user responses of the second plurality of users to the at least one user-type specific synthetic data item;
obtaining a plurality of user-defined control parameters from the second plurality of users;
configuring a user-defined control mechanism to share a portion of the real user data of the second plurality of users based at least in part on the plurality of user-defined control parameters;
obtaining a subset of the real user data based at least in part on the plurality of user-defined control parameters;
providing to the at least one first computing device associated with the at least one particular third-party data source, at least one of:
  i) data regarding the at least one user-type specific synthetic data item,
  ii) the at least one portion of the real user data of the second plurality of users; and
  iii) the plurality of indications of the second plurality of users;
receiving, in response to the providing, at least one second real data item from the at least one first computing device associated with the at least one particular third-party data source; and
presenting the at least one second real data item from the at least one particular third-party data source at a second GUI of the application executing at the plurality of second computing devices associated with the second plurality of users.

20. The non-transitory computer readable storage medium of claim 19, wherein the computer program instructions further define the steps of updating the synthetic data generation machine learning model based at least in part on at least one feedback pertaining to the presented at least one second real data item from the second plurality of users.

* * * * *